United States Patent [19]
King

[11] Patent Number: 5,659,240
[45] Date of Patent: Aug. 19, 1997

[54] INTELLIGENT BATTERY CHARGER FOR ELECTRIC DRIVE SYSTEM BATTERIES

[75] Inventor: Robert Dean King, Schenectady, N.Y.

[73] Assignee: General Electric Company, Schenectady, N.Y.

[21] Appl. No.: 390,205

[22] Filed: Feb. 16, 1995

[51] Int. Cl.$^6$ .............................. H02J 7/00; H02M 10/44
[52] U.S. Cl. ......................... 320/30; 320/39; 320/43; 320/48
[58] Field of Search ................................ 320/30, 31, 32, 320/39, 40, 43–44, 61, 48

[56] References Cited

U.S. PATENT DOCUMENTS

| | | | |
|---|---|---|---|
| 4,313,080 | 1/1982 | Park | 320/61 |
| 4,484,130 | 11/1984 | Lowndes et al. | 320/48 X |
| 4,667,143 | 5/1987 | Cooper et al. | 320/32 |
| 4,691,148 | 9/1987 | Nicholls et al. | 318/12 |
| 4,709,202 | 11/1987 | Koenck et al. | 320/39 |
| 5,227,703 | 7/1993 | Boothe | 318/139 |
| 5,266,880 | 11/1993 | Newland | 320/14 |
| 5,280,231 | 1/1994 | Kato et al. | 320/31 |
| 5,345,154 | 9/1994 | King | 318/49 |
| 5,349,282 | 9/1994 | McClure | 320/32 |
| 5,349,535 | 9/1994 | Gupta | 364/483 |
| 5,394,089 | 2/1995 | Clegg | 320/48 X |
| 5,397,991 | 3/1995 | Rogers | 324/434 |
| 5,545,969 | 8/1996 | Hasegawa | 320/48 X |

Primary Examiner—Peter S. Wong
Assistant Examiner—K. Shin
Attorney, Agent, or Firm—Marvin Snyder

[57] ABSTRACT

A battery charger connected to a source of substantially constant voltage power includes a regulator for conditioning the power for application to a battery to be charged. Net discharge current from the battery is monitored, as a function of time, during a time period between recharge cycles, and data representative of the net discharge current as a function of time is stored and used to compute net ampere-hour discharge data. The discharge data establish a total recharge ampere-hours to be applied to the battery, which corresponds to the net amount of discharge ampere-hours. The battery charger also compensates the total recharge ampere-hours by an amount determined from the age of the battery, and tracks the number of occurrences of recharge of the battery and the accumulated ampere-hours for applying an equalizing charge to the battery after a predetermined number of recharge occurrences and accumulated ampere-hours since a last equalizing charge. The charger further responds to battery temperature for adjusting the recharge constant voltage profile. The battery state of charge is computed from the monitored net ampere-hours of discharge current, and displayed. The battery may be the propulsion battery for an electric vehicle or for a hybrid vehicle which includes a combustion engine-driven generator to charge the battery.

26 Claims, 5 Drawing Sheets

INTELLIGENT BATTERY CHARGER FOR ELECTRIC DRIVE SYSTEM BATTERIES

This invention relates to battery chargers and, more particularly, to a battery charger for use in charging batteries used in electrically propelled vehicles.

BACKGROUND OF THE INVENTION

Commercial propulsion battery chargers, especially for off-road vehicles such as golf cars (either mounted on-board or off-board the vehicle), are usually designed as stand-alone units and are often manufactured by a different company than the supplier of the propulsion drive system. Battery voltage, charge current, and sometimes the slope of the charge current and/or the slope of the battery voltage versus time near the end of charge are used in the control of these commercial battery chargers. Today's commercial chargers with their unsophisticated control tend to overcharge the batteries, or improperly charge either aged batteries or batteries that are at temperatures significantly different than 80° F. Overcharging wastes energy, increases the required battery watering maintenance, and significantly reduces battery life. Maintenance personnel errors, including failure to start the charger or premature termination of the charge function, are often not detected. If the battery is not properly charged, then during the next use cycle, excessive discharge may occur and result in reduced battery life and poor vehicle performance.

SUMMARY OF THE INVENTION

The above and other disadvantages of prior battery chargers are overcome in a system in which the net ampere-hour discharge of a cyclically operated battery is computed from measured samples of discharge current. In addition to measured samples of battery current, measured samples of battery voltage and battery temperature provide a corresponding profile of these key parameters during the discharge. The battery is then recharged with an equivalent ampere-hour of charge. The system periodically adds an equalizing charge to the battery in addition to the normal charge. In addition, the battery state of charge is compensated for the battery's reduced capacity with aging, operation at low temperature and excessive current discharge rates. The state of charge is displayed for viewing by a vehicle operator.

The invention is implemented in a microprocessor controlled vehicle drive system and a microprocessor controlled battery charger. The control system or "controller" for the battery charger is coupled for monitoring battery current, battery voltage and battery temperature, and periodically stores such data in a non-volatile memory. During a recharge cycle, the charger controller accesses the memory to retrieve the discharge history for the battery. The discharge data are then manipulated to determine the net ampere-hours of discharge. The charger controller then computes a target recharge ampere-hour value equal to the net ampere-hours discharged plus an overcharge amount. During recharge, the charger initially operates in a constant current mode until a predetermined voltage level, compensated for temperature, is reached. Thereafter, the charger operates in a constant voltage mode with decreasing current until slightly more ampere-hours of recharge is supplied to the battery than was withdrawn during battery use. If a fault should occur during the charging process, the charger stores an indication of the ampere hours charged prior to terminating the charge. Faults include, for example, an AC power failure, or the measured battery parameters (voltage or temperature) being out of the range allowed for the battery under charge.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) in which:

DETAILED DESCRIPTION OF THE INVENTION

Figure 1:
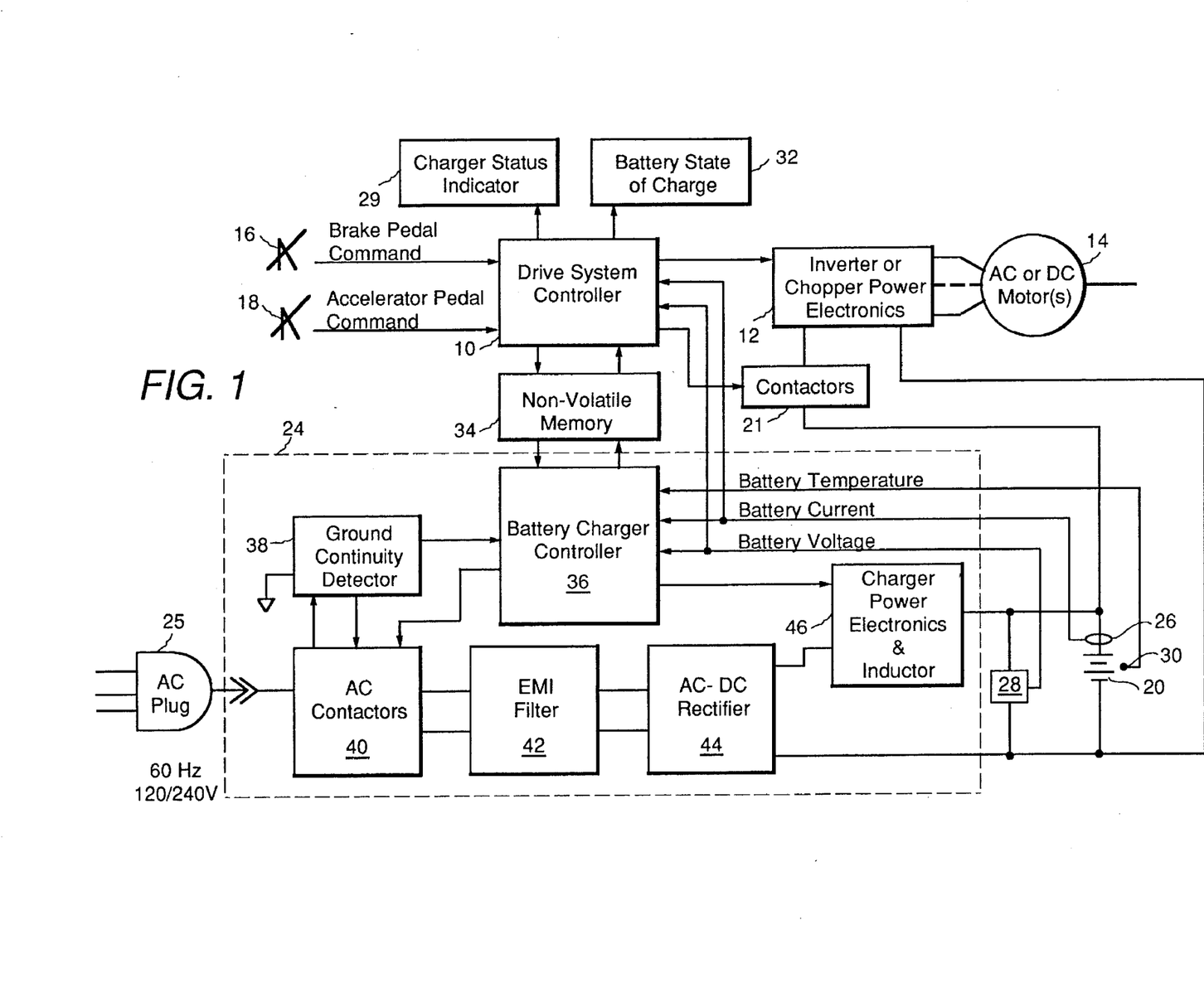
FIG. 1 is a simplified block diagram of an electric vehicle drive system and battery charger incorporating the teaching of the present invention.

FIG. 1 is a simplified block diagram of an electrical drive system, with an intelligent interface to a battery charger, for propelling a vehicle. The vehicle drive system includes an electric drive system controller 10 coupled to a circuit 12, which may constitute either a direct current (DC) to alternating current (AC) inverter or a direct current (DC) to direct current chopper controllable switching power supply, for operating one or more associated AC or DC drive motors 14. Drive system controller 10 responds to brake commands from a brake pedal 16 or accelerator commands from an accelerator pedal 18 to control drive motor 14. A propulsion battery 20 is connected to the vehicle drive system through contactors 21 and may be connected to a battery charger 24 which is either on-board or off-board the vehicle. Battery 20 may constitute a battery pack including sensors 26, 28 and 30 for providing signals representing current, voltage and temperature, respectively. Sensor 30 may comprise a plurality of temperature sensors, each coupled to a respective cell, or module containing a plurality of cells, of a multi-cell battery. Drive system controller 10 may include a battery state of charge indicator block 32 and a battery charger status indicator 29. Battery charger 24 is typically adapted to be connected to an AC source (not shown) via a connector 25. The electronic circuits necessary for implementing the system of FIG. 1 are known in the art; however, if implemented in digital form, the functions of drive controller 10, non-volatile memory 34, voltage sensor 28, state of charge indicator 32 and possibly even battery charger controller 36 may be implemented in the same microcomputer.

Figure 2:
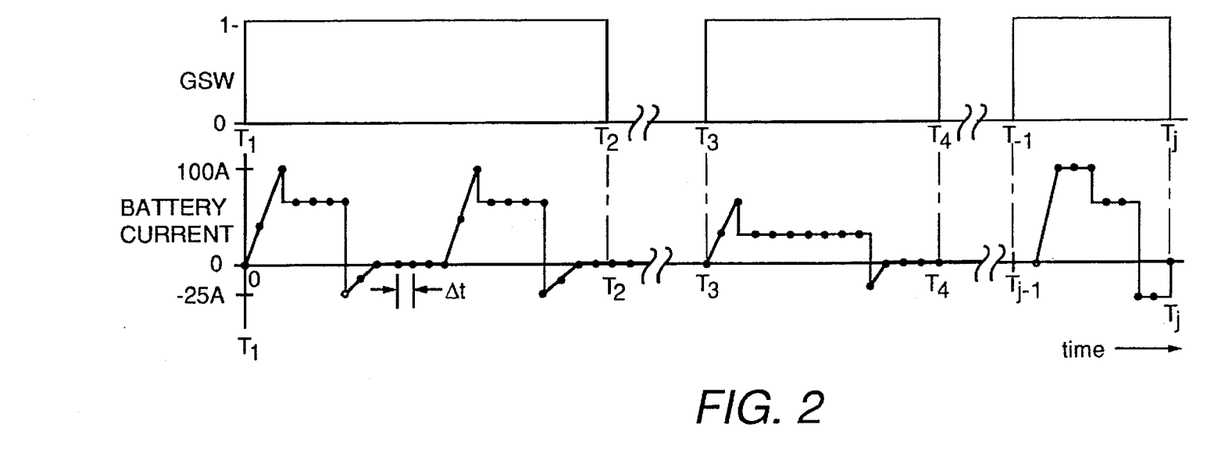
FIG. 2 is a graph of battery discharge current versus time for cyclical operation of an electric vehicle with a regenerative braking mode of operation.

The vehicle drive system may be full electric drive such as is commonly used on golf cars, electric utility vehicles, or on-road electric vehicles or a hybrid electric/internal combustion engine drive of a type sometimes used for on-road vehicles. During vehicle operation, battery 20 is called upon to supply power in cycles. For example, a golf car is typically operated for several minutes and then parked for several minutes. A typical battery current profile for such operation is shown in FIG. 2 wherein the golf car key switch, represented as GSW, is "on" at level 1 and "off" at level 0. As shown in FIG. 2, after the key switch is turned "on", current draw is high at start-up and then settles to a value for running during vehicle cruise at substantially constant loading. If the vehicle is operated on hilly terrain, regenerative current may be supplied to the battery as the vehicle decelerates to a stop, as shown by the negative current. The ampere-hour (AH) usage is defined by $$AH = \int_0^T IBat(t)dt \quad (1)$$

where IBat represents bipolar battery current (i.e., charge or negative current and discharge or positive current) and is a function of time, and T is the duration of a sub-cycle discharge. If the system is microprocessor controlled using an analog-to-digital converter, the AH discharge is defined by $$AH = \sum_{N=0}^{N=L} IBat(N)\Delta t \quad (2)$$

where $\Delta t = t_N - t_{N-1}$ and L=total number of samples of battery current.

Figure 3:
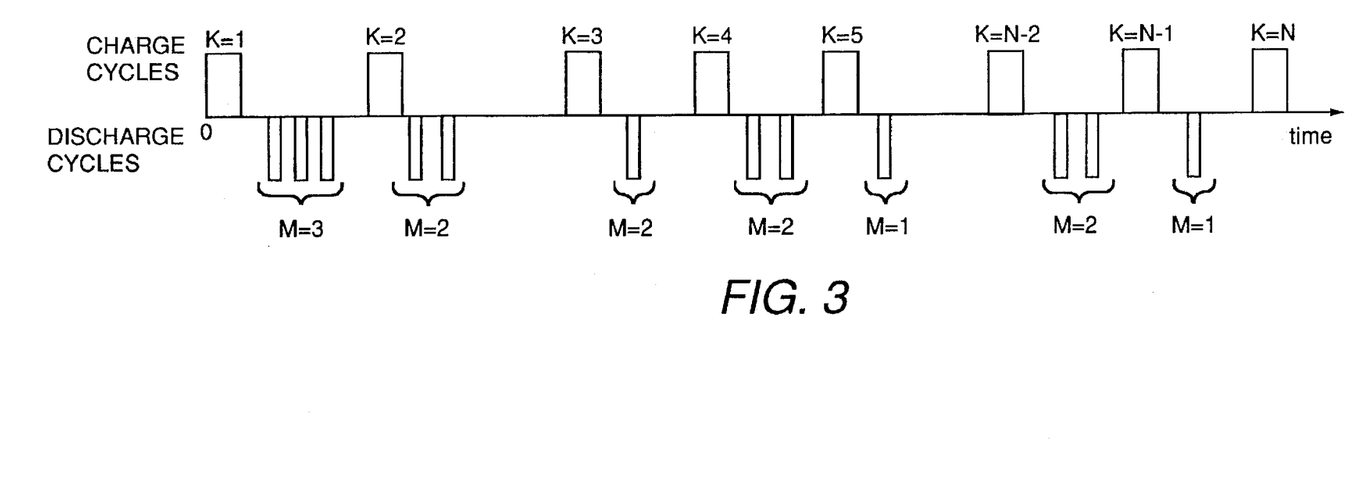
FIG. 3 is a chart illustrating charge and discharge cycles over the life of a rechargeable battery.

A typical charge/discharge pattern for an electric vehicle battery is shown in FIG. 3. The battery is initially charged during a first charge cycle K=1 and then put into service at the end of this charge cycle. Several sub-cycles M of discharge (such as, for example, M=3) may occur before the next charge cycle K=2. Thereafter, the pattern illustrates one or more discharge sub-cycles between each successive charge sub-cycle. The number of ampere-hours discharged is calculated from the equation:

$$AH_j = \int_0^{T_j} IBat(t)dt \quad (3)$$

where $T_j$ is the time over the $j^{th}$ battery discharge sub-cycle. Each sub-cycle may include regenerative braking.

A discharge sub-cycle is defined as a sequence of battery discharge currents followed by a period of either zero discharge current, i.e., key switch turned off, or a recharge current from an auxiliary power unit (APU) in a hybrid vehicle. For example, with reference to FIG. 2:

$$AH_1 = \int_{T1}^{T2} IBat(t)dt, \quad (4)$$

$$AH_2 = \int_{T3}^{T4} IBat(t)dt,$$

$$AH_j = \int_{T_{j-1}}^{T_j} IBat(t)dt, \text{ and}$$

$$AHNet_k = \sum_{j=1}^{j=M} AH_j,$$

where AHNet represents net ampere-hours discharged from the battery accumulated during operation since the last complete battery recharge, and M is the total number of discharge sub-cycles after the $k^{th}$ charge cycle.

The average ampere-hours discharged from the battery over M sub-cycles occurring after the $k^{th}$ recharge cycle may be represented as:

$$AvgAH_k = \frac{AHNet_k}{M}, \quad (5)$$

while the average discharge current during the $j^{th}$ sub-cycle may be represented as:

$$AvgI_j = \frac{AH_j}{(T_j - T_{j-1})}. \quad (6)$$

Idle time is the total time (in hours) since the last complete, normal termination battery charge (at time $T_o$) when the battery was neither being charged or discharged; i.e., the key switch was "off" (GSW=0).

Total accumulated ampere-hours discharged from the battery since it was installed new in the vehicle may be represented as:

$$AccumAH_N = \sum_{K=1}^{K=N} AHNet_k \quad (7)$$

where N is the number of recharge cycles since the battery was installed new in the vehicle. AccumAH, along with the depth of discharge of each subcycle discharge, is used as a projection of the life of the battery.

The following definitions are used in equations 9–14:

1. IChg=Battery charge current into battery. IChg is of opposite polarity to IBat during discharge.

2. PcOverch=Desired percentage ampere-hour overcharge during the battery recharge operation. PcOverch is a function of battery age.

3. BatTemp=Measured battery temperature(s) in degrees Fahrenheit.

4. PcSlfDis=percent battery self discharge per hour. PcSlfDis is based on manufacturers' data or measurements, and is a function of battery temperature (BatTemp). PcSlfDis is often specified by manufacturer in percentage discharge per week.

5. DisTime=Total accumulated time (hours) since the propulsion battery became operational in the drive, i.e., was discharged and charged via regenerative braking (key switch "on") since the last complete battery recharge.

6. NomAHCap=Nominal ampere-hour capacity for a new battery at the discharge rate specified by the manufacturer. NomAHCap is often referred to as "C"; for example, a 5 hour discharge is designated C5.

7. AHCap=Ampere-hour capacity of the battery while it is being discharged at a rate other than the rate specified by the manufacturer. AHCap is also a function of battery temperature, battery age (calendar life), and total accumulated ampere-hours discharged by the battery.

8. AHTarget=The ampere-hour to be supplied by the charger during the next battery charge.

Information or data necessary to perform the above calculations are stored in a non-volatile memory 34, shown in FIG. 1, during operation of the vehicle drive system. Memory 34 is addressable from battery charger 24 to allow charger 24 to determine the amount of charge required to return battery 20 to its fully charged state. Memory 34 stores sensed and computed data during battery discharge. For example, memory 34 can sample and store battery temperature profile, ampere-hours charged, ampere-hours discharged, net ampere-hours discharged (ampere-hours discharged minus ampere-hours recovered during regenerative braking), average net discharge current, open circuit battery voltage profile, total accumulated ampere-hours discharged in each discharge cycle and total number of discharge cycles. During battery charging, memory 34 stores such data as battery temperature profile, ampere-hours of charge, battery charge profile and charger status. Charger status can include an AC power failure, termination of charging, and battery charger faults. The accumulated data are used by battery charger controller 36, which comprises a microprocessor, and drive system controller 10, which also comprises a microprocessor, to precisely charge battery 20.

Although battery charger 24 is exemplified as a transformerless, high frequency charger with a ground continuity detector 38, any type of controllable charger could be used with the control concept set forth herein. Furthermore, in the special case where charger 24 is integrated into the vehicle drive system, controller 36 and controller 10 could be combined into a single controller. The AC power input is preferably supplied through a set of controllable AC contactors 40 and an EMI (electromagnetic interference) filter 42 to a rectifier 44. The rectified power is then supplied from rectifier 44 to a power conditioner 46 which regulates the voltage and current furnished to battery 20 in response to controller 36.

During battery charging, charger 24 is initially operated in a constant current mode, limited by the power available from the particular electric service connected to connector 25, until a temperature compensated voltage at the battery is achieved. Thereafter, the charger operates at a constant voltage, with current tapering to a low value that is a function of the battery parameters and consistent with the battery manufacturer's recommendation. Battery charge termination is primarily based on supplying slightly over 100% of the ampere-hours during recharge, compared to the total net ampere-hours discharged since the last recharge. Other charge termination criteria are also applied as default values in the event that a fault should occur or if battery parameters were incorrectly stored in the software.

Periodically, a low level equalizing charge needs to be applied to the battery. Data computed in drive system controller 10 and stored in non-volatile memory 34 are used to establish when the normal charge should automatically be followed by an equalizing charge. If the charge period does not allow this equalizing charge to be completed, then this information is presented to the driver through battery charger status indicator 29.

The intelligent battery charger of the invention provides compensation to prevent overcharging of aged batteries. In addition, the computed state of charge, as shown by indicator 32 on the vehicle instrument panel, is compensated for the battery's reduced capacity as a result of battery age, operation at low battery temperatures, and excessive discharge rates.

Operation of charger 24 is controlled by controller 36 in response to the measured parameters (current, voltage and battery temperature) and the stored data in memory 34. Once controller 36 has calculated the net ampere-hour discharge using the above equations, the amount of recharge current can be determined from the following relationships.

If the $K^{th}$ charge cycle was completed with normal termination, i.e., not prematurely terminated, the number of ampere-hours to be delivered to the battery during the K+1 charge cycle is: AH Target $_{K+1}$. Thus $$AH\text{Target}_{K+1} = AH\text{Net}_K * \left( 1 + \frac{PcOverch}{100} \right) + \quad (8)$$

$$Nom AH\text{Cap} * \frac{PcSlfDisch}{100} * \text{Idle Time}$$

where PcOverch is typically 2–5% for lead-acid or 0.5–1.0% for nickel-cadmium (Ni-Cd) batteries for "normal" i.e. non-equalizing charge.

If the $K^{th}$ charge cycle was not "normal termination", i.e., charge was terminated due to a power failure, manual termination in error by operator, or terminated as a result of a fault or blown fuse, then:

$$AH\text{Target}_{K+1} = (|AH\text{Target}_{K-1}| - |AH\text{Chg}_{K-1}|) + \quad (9)$$

$$AH\text{Net}_K * \left( 1 + \frac{PcOverch}{100} \right) + Nom AH\text{Cap} * \frac{PcSlfDisch}{100} * \text{Idle Time}$$

where $AHChg_K$ is the integral of ICHg(t), (IChg(t)=—IBat(t) during battery charging) integrated from the time the charge started until it was prematurely terminated.

The charger operates in two modes, i.e., constant current and constant voltage. The charger operates in a constant current mode until the battery voltage exceeds a temperature compensated value:

$$VperCell > V1 - Tcoeff * (Btemp - 20° C.)$$

Typical values for a Ni-Cd battery are:

V1=1.55V/cell when charged at a C/5 rate, and Tcoeff= 0.004V/(cell* °C.)

Typical values for a lead-acid battery are:

V1=2.50V/cell when charged at a C/3 rate, and Tcoeff= 0.007V/(cell* °C.) where Btemp is the sensed battery temperature.

If multiple battery temperature sensors are utilized, the battery with the highest temperature is used to set the voltage in the constant voltage mode of operation.

Figure 4:
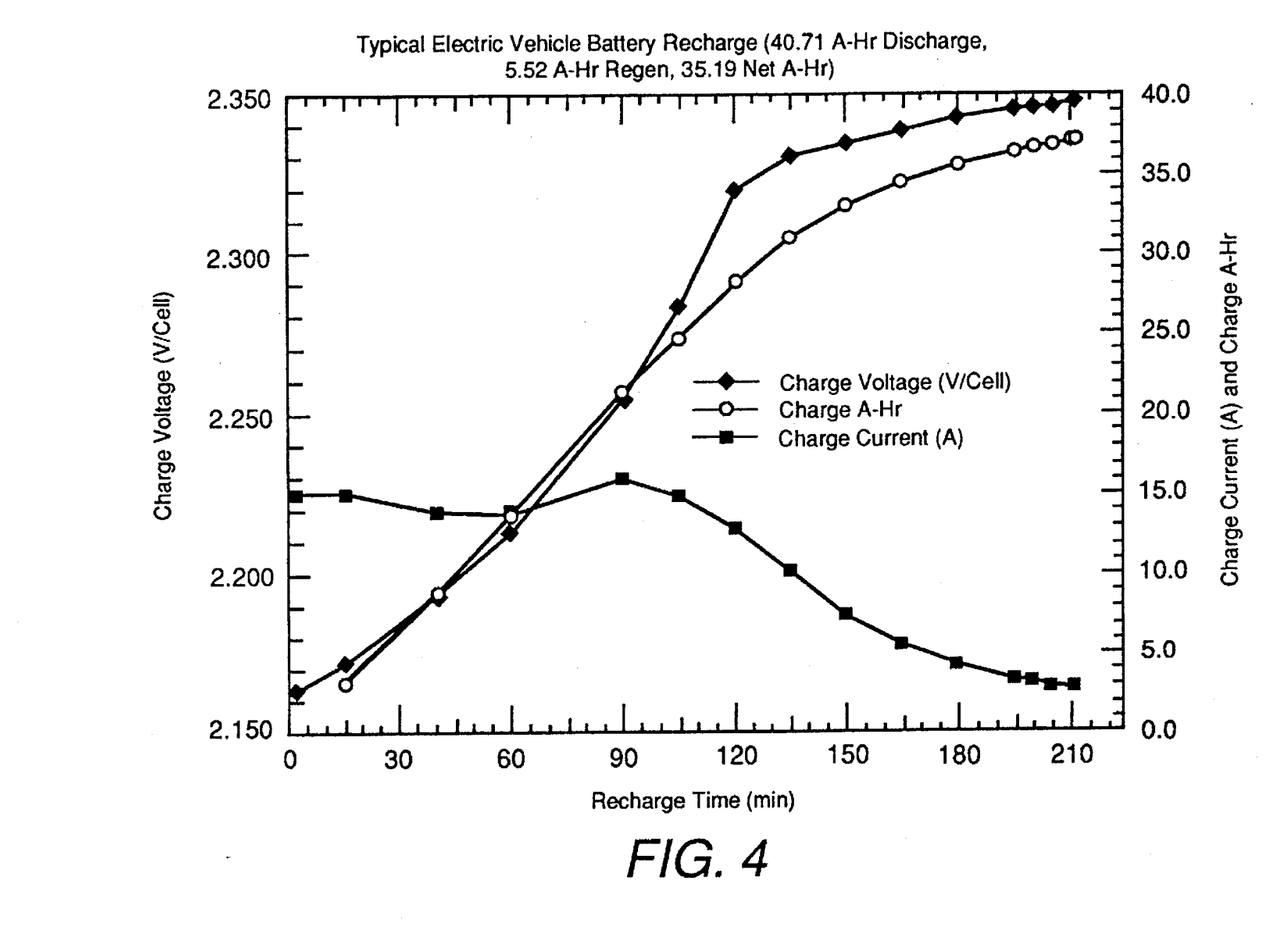
FIG. 4 is a graph illustrating recharge of a battery as a function of time.

FIG. 4 is a plot of a typical lead acid battery recharge for initial operation in a constant current mode followed by a temperature compensated constant voltage mode. The curve is based on the following assumptions:

40.71 AH discharge 5.52 AH regenerative 35.19 AHNet 37.23 AH charge, for 106% net AH recharge.

An equalization charge (increased ampere-hour target plus a reduced voltage in the constant voltage mode of operation) is performed automatically by the charger control. The selection of when the equalization charge is performed is based on the value of AccumAH since the last equalization charge. For lead-acid batteries, manufacturers typically recommend one equalization charge after 10 to 20 normal charge cycles, or at least one equalization charge per calendar month.

The number of ampere-hours to be provided by the charger during the K+1$^{th}$ charge cycle, (provided the K$^{th}$ charge cycle was completed with "normal termination") for an equalization charge is:

$$AH\text{Target}_{K+1} = AH\text{Net}_K * \left( 1 + \frac{PcOverchEq}{100} \right) + \quad (10)$$

$$Nom AH\text{Cap} * \frac{PcSlfDisch}{100} * \text{Idle Time}$$

where PcOverchEq (i.e., the desired percentage ampere-hour overcharge during battery equalization charging) is typically 5–10% for a lead-acid battery equalization charge.

Charge termination criteria are as follows:

for "normal termination"

1. $|AHChg_K| \geq |AHTarget_K|$

2. Charge Time>Maximum allowable charge time

For "fault termination":

1. Btemp>Battery Temperature Limit

2. |IChg(t)|>Charger maximum current limit where IChg(t)=IBat(t) with the polarity of IBat(t) during discharge 3. |IChg(t)|<Charger minimum current limit Battery state of charge (SOC) is estimated by using the computed value of AHNet during each sub-cycle and the computed ampere hour capacity (AHCap), in accordance with equation (12):

$$SOC=(AHNet/AHCap)*100\%. \qquad (12)$$

Figure 5:
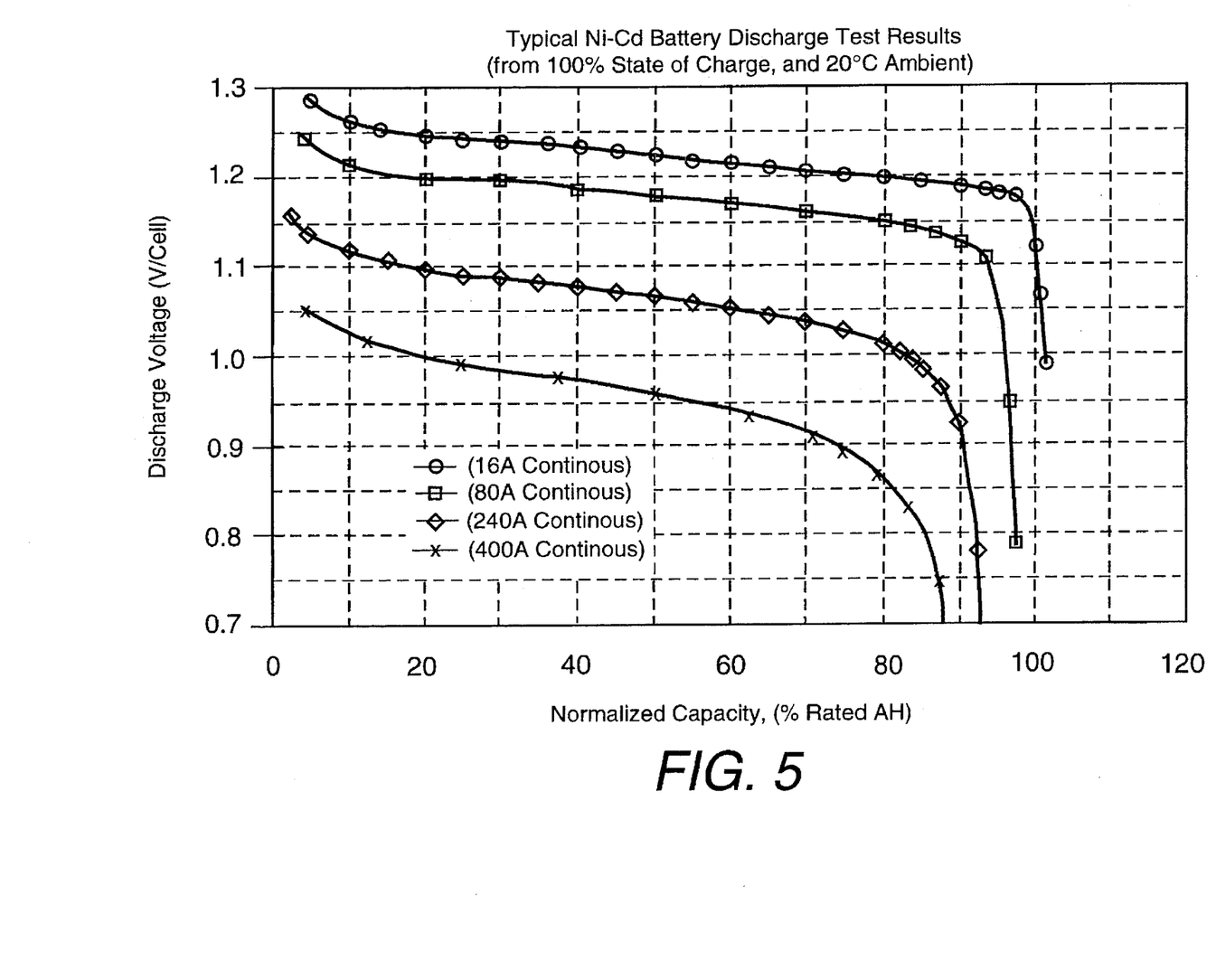
FIG. 5 illustrates discharge characteristics of a Ni-Cd battery.

The AHCap is a function of average discharge current that can be determined from either the Puekert relationship or from measured battery data such as shown in FIG. 5, which represents characteristics of an 80 ampere-hour capacity battery at discharge rates ranging from 16 amps continuous to 400 amps continuous. For many batteries, the AHCap is also a function of battery temperature. In general, the AHCap of a lead-acid battery operating at high discharge current exhibits a greater reduction in AHCap than does a Ni-Cd battery. An example of a battery state of charge indicator for an electrically powered vehicle is shown in U.S. Pat. No. 5,119,011 issued Jun. 2, 1992 and assigned to the instant assignee.

Cycle life is a function of the depth of discharge (DOD) that the battery is operated at, as set forth in equation (13):

$$DOD=\text{Depth of Discharge}=(1-SOC)*100\%. \qquad (13)$$

Figure 6:
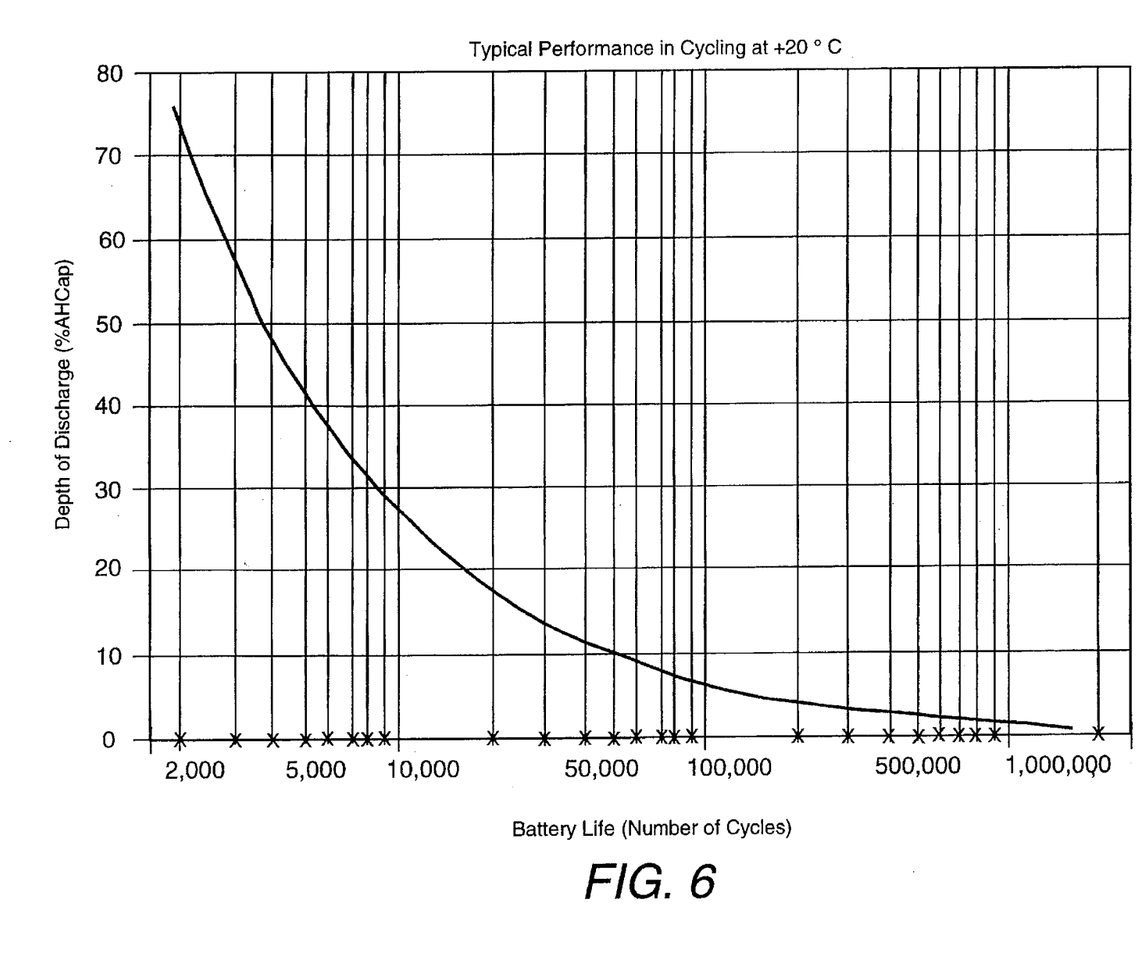
FIG. 6 illustrates battery lifetime as a function of depth of discharge.

FIG. 6 shows a typical relationship between battery cycle life and DOD for a nickel-cadmium battery operated at +20° C. From FIG. 6, it is apparent that battery charging in an intelligent manner after a shallow discharge, i.e. "opportunity charging", whether from an external power source or from an auxiliary power unit in a hybrid vehicle, can significantly improve the life of the battery.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A battery charger comprising:

regulating means for receiving substantially constant voltage power and conditioning the power for application to a battery to be charged;

control means coupled to said regulating means and adapted to control said regulating means to introduce a controlled amount of electrical charge to the battery;

monitoring means operatively associated with the battery for monitoring net discharge current, as a function of time, from the battery during an interval between recharge cycles and for storing data representative of the net discharge current as a function of time, said monitoring means including means for converting said net discharge current as a function of time into net ampere-hour discharge data; and means for providing said discharge data from said monitoring means to said control means for establishing a total recharge ampere-hours to the battery in an amount corresponding to the net amount of discharge ampere-hours.

2. The battery charger of claim 1 including means for compensating the total recharge ampere-hours by an amount determined from the age of the battery.

3. The battery charger of claim 2 including means for tracking the number of occurrences of recharge of the battery and the accumulated ampere-hours and for applying an equalizing charge to the battery after a predetermined number of recharge occurrences and accumulated ampere-hours since a last equalizing charge.

4. The battery charger of claim 3 including means for sensing battery temperature and for adjusting recharge constant voltage profile inversely with temperature.

5. The battery charger of claim 4 wherein said monitoring means includes means for computing and displaying the battery state of charge from said monitored net ampere-hours of discharge.

6. The battery charger of claim 5 including means for compensating said battery state of charge as a function of battery age and sensed battery temperature.

7. The battery charger of claim 6 wherein said constant voltage power comprises alternating current and said power conditioning means includes a rectifier circuit for converting said alternating current to direct current and a switching power regulator for conditioning said direct current to a value suitable for application to the battery.

8. The battery charger of claim 7 including a ground continuity check circuit for disabling operation of said battery charger upon detection of an open ground condition.

9. The battery charger of claim 8 wherein the battery comprises a plurality of independent cells and the battery temperature sensing means includes means for sensing temperature of each independent cell.

10. The battery charger of claim 8 wherein the battery comprises a plurality of independent cells within at least one battery module, and the battery temperature sensing means includes means for sensing temperature of said at least one battery module.

11. A method for charging a rechargeable battery pack, comprising the steps of;

sensing discharge current of the battery pack as a function of time;

computing, from the sensed discharge current and time duration of discharge, net ampere-hours discharged by the battery; and recharging the battery until at least the computed net ampere-hours of discharge is returned to the battery.

12. The method of claim 11 including the further step of computing an excess ampere-hour charge for overcharging the battery.

13. The method of claim 11 wherein the battery is coupled to supply power to an electrical drive system of an electrical motor propelled vehicle, the vehicle being operative in an electrically regenerative braking mode wherein the motor operates as an electrical power generator, the method comprising the further steps of:

sensing current supplied from the motor to the battery as a function of time during electrical braking; and computing total ampere-hours of charge supplied to the battery;

wherein the step of computing the net ampere-hours discharged from the battery includes subtracting the total ampere-hours of charge from a total ampere-hours of discharge.

14. A battery charger for a battery coupled for supplying power to an electric drive system of an electric motor propelled vehicle, the vehicle being selectively operative in an electrical braking mode wherein the motor operates as an electrical generator for returning power to the battery, the charger comprising:

regulating means for receiving substantially constant voltage power and conditioning the power for application to a battery to be charged;

control means coupled to said regulating means and adapted to control said regulating means to introduce a controlled amount of electrical charge to the battery; and monitoring means coupled to the battery for measuring total discharge current, as a function of time, from the battery while the motor is operative in a propulsion mode and for measuring total charge current, as a function of time, while the motor is operative in a braking mode, said monitoring means including means for converting said measured charge and discharge currents to a net ampere-hours of discharge;

said control means being coupled to said monitoring means for establishing operation of the battery charger to recharge the battery with an amount of electrical charge corresponding to at least said net ampere-hours of discharge.

15. The method of claim 11 wherein the step of computing net ampere-hours discharged by the battery comprises periodically recharging the battery during a recharge cycle and computing the net ampere-hours discharged between successive recharge cycles.

16. The method of claim 15 including the step of storing data representative of a total number of recharge cycles, a depth of discharge for each period between recharge cycles, and total ampere-hours discharged from the battery for all discharge intervals.

17. The method of claim 15 wherein the step of recharging the battery comprises recharging the battery in a constant current mode until battery voltage equals a selected voltage limit and thereafter recharging the battery in a constant voltage mode until the net ampere-hours of discharge has been returned to the battery.

18. The method of claim 17 including the steps of sensing battery temperature and compensating the selected voltage limit inversely with sensed battery temperature.

19. The method of claim 18 including the step of increasing net ampere-hours of recharge by a variable amount specified for the battery.

20. The method of claim 19 including the step of compensating the net ampere-hours of recharge for battery self-discharge when the battery is not under load.

21. The method of claim 20 including the steps of computing a relative age of the battery from the stored data and modifying the recharge cycle and net ampere-hours of recharge as a function of the relative age.

22. The method of claim 21 including the step of terminating a recharge cycle when said constant voltage mode is maintained for at least a selected time period.

23. The method of claim 22 including the step of displaying battery state of charge computed from said net ampere-hours of discharge.

24. The method of claim 19 wherein said variable amount is in the range of about 2% to 5% of net ampere-hour discharge between charge cycles.

25. The method of claim 18 wherein the selected voltage limit is computed from $$VperCell = V1 - Tcoeff*(Btemp - 20° C.)$$

where VperCell is the selected voltage limit per cell, V1 is an ideal per cell battery voltage, Tcoeff is a battery temperature coefficient in volts per cell per degree centigrade and Btemp is sensed battery temperature.

26. A battery charger for a battery coupled for supplying power to an electric drive system of an electric motor propelled hybrid vehicle, the vehicle having an internal combustion engine coupled to electric generating means for providing the vehicle with propulsion power at selected times and for controllably charging the battery, the vehicle being selectively operative in an electrical braking mode wherein the motor operates as an electrical generator for returning power to the battery, the charger comprising:

regulating means for receiving substantially constant voltage power and conditioning the power for application to a battery to be charged;

control means coupled to said regulating means and adapted to control said regulating means to introduce a controlled amount of electrical charge to the battery; and monitoring means coupled to the battery for measuring total discharge current, as a function of time, from the battery while the motor is operative in a propulsion mode, for measuring total charge current, as a function of time, while the motor is operative in a braking mode, and for measuring electrical power returned to the battery during operation of said engine, said monitoring means including means for converting said measured charge and discharge currents to a net ampere-hours of discharge and for adjusting said net ampere-hours of discharge by an amount corresponding to said measured electrical power;

said control means being coupled to said monitoring means for establishing operation of the battery charger to recharge the battery with an amount of electrical charge corresponding to at least said net ampere-hours of discharge.

* * * * *